United States Patent
Ito et al.

(10) Patent No.: US 11,984,679 B2
(45) Date of Patent: May 14, 2024

(54) CONNECTOR SET AND CONNECTOR

(71) Applicant: YAMAICHI ELECTRONICS CO., LTD., Tokyo (JP)

(72) Inventors: Toshiyasu Ito, Tokyo (JP); Yosuke Takai, Tokyo (JP)

(73) Assignee: YAMAICHI ELECTRONICS CO., LTD., Tokyo (JP)

(*) Notice: Subject to any disclaimer, the term of this patent is extended or adjusted under 35 U.S.C. 154(b) by 212 days.

(21) Appl. No.: 17/559,200

(22) Filed: Dec. 22, 2021

(65) Prior Publication Data
US 2022/0209445 A1     Jun. 30, 2022

(30) Foreign Application Priority Data
Dec. 24, 2020     (CN) .......................... 202011549692.7

(51) Int. Cl.
*H01R 12/71*     (2011.01)
*H01R 12/70*     (2011.01)
*H01R 13/506*    (2006.01)

(52) U.S. Cl.
CPC ......... *H01R 12/716* (2013.01); *H01R 12/707* (2013.01); *H01R 13/506* (2013.01)

(58) Field of Classification Search
None
See application file for complete search history.

(56) References Cited

U.S. PATENT DOCUMENTS

| | | | | |
|---|---|---|---|---|
| 5,876,215 A | * | 3/1999 | Biernath | H01R 12/714 439/67 |
| 6,805,278 B1 | * | 10/2004 | Olson | H01R 12/707 439/83 |
| 2002/0098727 A1 | * | 7/2002 | McNamara | H01R 13/6585 439/108 |
| 2006/0172570 A1 | * | 8/2006 | Minich | H05K 7/1069 439/83 |
| 2010/0304584 A1 | | 12/2010 | Miyazaki et al. | |
| 2016/0172780 A1 | * | 6/2016 | Tamai | H01R 12/712 439/733.1 |
| 2018/0013240 A1 | * | 1/2018 | Takeuchi | H01R 13/652 |
| 2023/0145507 A1 | * | 5/2023 | Hashiguchi | H05K 3/3421 361/760 |

FOREIGN PATENT DOCUMENTS

| | | |
|---|---|---|
| JP | 2007335231 A | 12/2007 |
| JP | 2018-113146 A | 7/2018 |
| WO | 2020010245 A1 | 1/2020 |

* cited by examiner

*Primary Examiner* — Oscar C Jimenez
(74) *Attorney, Agent, or Firm* — Hayes Soloway PC

(57) ABSTRACT

A connector set is disclosed that includes a plurality of connectors and a cap to be attached to the plurality of connectors when the plurality of connectors are reflow-mounted on an external substrate. Each one end portion of the connectors and the cap is provided with a fitted portion and a fitting portion to be fitted in the fitted portion. The fitted portion is provided with an opening portion for moving the fitting portion so as to absorb thermal expansion from one end portion side to the other end portion side due to temperature conversion of reflow.

11 Claims, 8 Drawing Sheets

CONNECTOR SET AND CONNECTOR

CROSS-REFERENCE TO RELATED APPLICATION

This application claims the benefit of Chinese patent application CN202011549692.7, filed on Dec. 24, 2020, the contents of which are incorporated by reference herein.

TECHNICAL FIELD

The present disclosure relates to a high-speed transmission connector to be mounted on a circuit board, in particular, to a mezzanine connector that electrically connects different circuit boards.

BACKGROUND

Among connectors for mediating high-speed transmission of signals between a circuit board and an expansion board, there is a type of connector in which a socket type connector to be mounted on a circuit board side, a plug type connector to be mounted on an expansion board side, and terminals of both connectors are electrically connected by fitting the plug type connector to the frontage of the connector. This type of connector is called as a mezzanine connector.

As an example of documents disclosing a technique related to this type of connector, Japanese Patent Application Publication No. 2018-113146 (hereinafter referred to as "Patent Document 1") can be taken up. The connector described in this document has a box-shaped housing and contacts arranged side by side on its wall surface. The bottom surface of the housing of this connector is provided with a boss inserted into a positioning hole in a circuit board, and contacts are provided at the frontage on the opposite side to the side with the boss of the housing. The reflow mounting of this type of connector on a circuit board is performed by placing the connector at a predetermined position on the board with the cap attached to the connector, raising the temperature from ordinary temperature to about 260 degrees to melt the solder, and returning it to ordinary temperature.

By the way, both the housing and the cap of this type of connector are formed of resin as a material, but if the molding directions of the resin of the housing and the cap are different, there may be a large difference in thermal expansion coefficients of the two elements during reflow. In this case, there was a problem that excessive expansion of the cap caused the housing of the connector to be pressed and widened, which caused distortion of the housing of the connector and occurrence of solder cracks.

The present disclosure has been made in view of such a problem, and one of the objects is to provide a technical means capable of preventing housing distortion and solder cracks during reflow of the housing and the cap.

SUMMARY

In accordance with a first aspect of the present disclosure, there is provided a connector set including a plurality of connectors and a cap to be attached to the plurality of connectors when the plurality of connectors are reflow-mounted on an external substrate. Each one end portion of the connectors and the cap is provided with a fitted portion and a fitting portion to be fitted in the fitted portion, and the fitted portion is provided with an opening portion for moving the fitting portion so as to absorb thermal expansion from one end portion side to the other end portion side due to temperature conversion of reflow.

In accordance with a second aspect of the present disclosure, there is provided a connector gathered by a cap and reflow-mounted on an external substrate, including: a plurality of slots extending in one direction and separated by a partition wall; a bottom portion that becomes a bottom of the connector; two first wall portions that extend in a direction orthogonal to the slots and face each other across the slots; and two second wall portions that extend in a direction parallel to the slots and face each other across the slots so as to surround the slots together with the two first wall portions, wherein one first wall portion of the two first wall portions is provided with a round hole for fitting with a positioning pin of the cap, the other first wall portion of the two first wall portions is provided with a long hole which is a long hole for fitting with a positioning long pin of the cap and is opened on the other side, when the cap expands together with the connector, the positioning long pin fitted in the long hole moves toward the other side in the long hole.

In accordance with a third aspect of the present disclosure, there is provided a connector set including a plurality of connectors and a cap to be attached to the connectors when the connectors are reflow-mounted on an external substrate, wherein the cap has a box shape provided with an opening for accommodating and holding the connectors, and an adsorption sheet is adsorbed on a surface opposite to the opening side of a plurality of caps.

DETAILED DESCRIPTION

Hereinafter, a connector 1 and a cap 100 forming a connector set according to one embodiment of the present disclosure will be explained with reference to the drawings. This connector 1 is a so-called socket type connector. The connector 1 is used by fitting with a so-called plug type connector. The connector 1 and the plug type connector 1 are separately mounted on two electronic substrates. When the header of a communication counterpart connector is fitted into the slot 19 of the connector 1, contacts 8 of the two connector 1 are electrically connected to each other, and high speed differential transmission based on PAM (Pulse Amplitude Modulation) becomes possible. The cap 100 is attached to the connector 1 when the connector 1 is reflow-mounted on the board.

In the following description, the attaching direction of the cap 100 to the connector 1 is appropriately referred to as the Z direction, a direction orthogonal to the Z direction is appropriately referred to as the X direction and a direction orthogonal to the Z direction and the X direction is appropriately referred to as Y direction. In addition, the +Z side may be referred to as an upper side, the −Z side may be referred to as a lower side, the +X side may be referred to as a front side, the −X side may be referred to as a rear side, the +Y side may be referred to as a left side, and the −Y side may be referred to as a right side.

Figure 5:
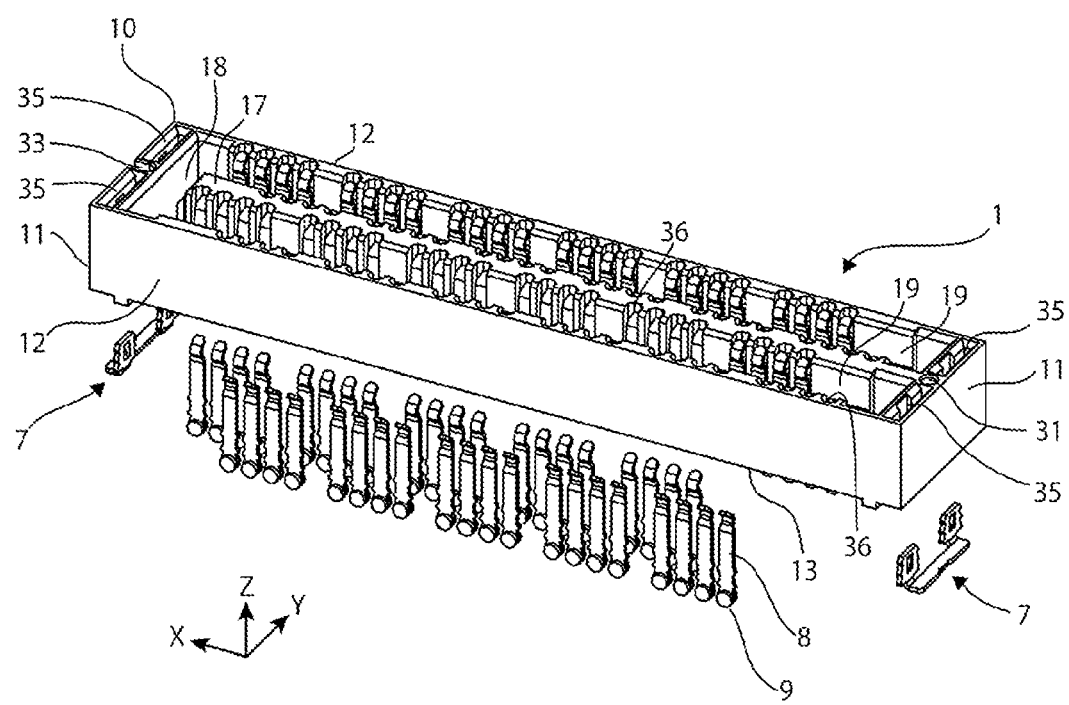
FIG. 5 is an exploded view of the connector of FIG. 1.

As shown in FIG. 5, the connector 1 has a housing 10, solder tab terminals 7, and contacts 8. The housing 10 of the connector 1 is formed by injecting resin in the arrow B direction of FIG. 1 which is the longitudinal direction thereof. The housing 10 of the connector 1 has a rotationally asymmetrical shape.

More specifically, the housing 10 of the connector 1 is provided with two slots 19. The two slots 19 extend in the X direction. The housing 10 has a bottom portion 13 that functions as the bottom of the housing 10, wall portions 11 and wall portions 12 respectively facing each other in the X direction and the Y direction across the slots 19, and a partition wall 17 separating the two slots 19 in a frontage surrounded by the wall portions 11 and the wall portions 12. The wall portions 11 extend in the Y direction, and the wall portions 12 extend in the X direction. In the present disclosure, the wall portions 11 and the wall portions 12 correspond to, for example, the first wall portions and the second wall portions that are defined in claims, respectively.

Figure 4A:
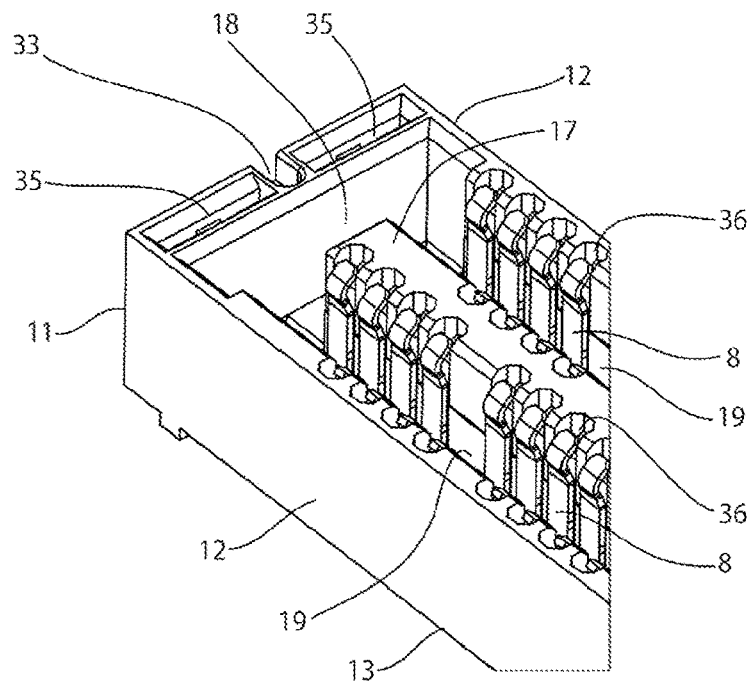
FIG. 4A is an enlarged view of the A frame of FIG. 3A.
Figure 4B:
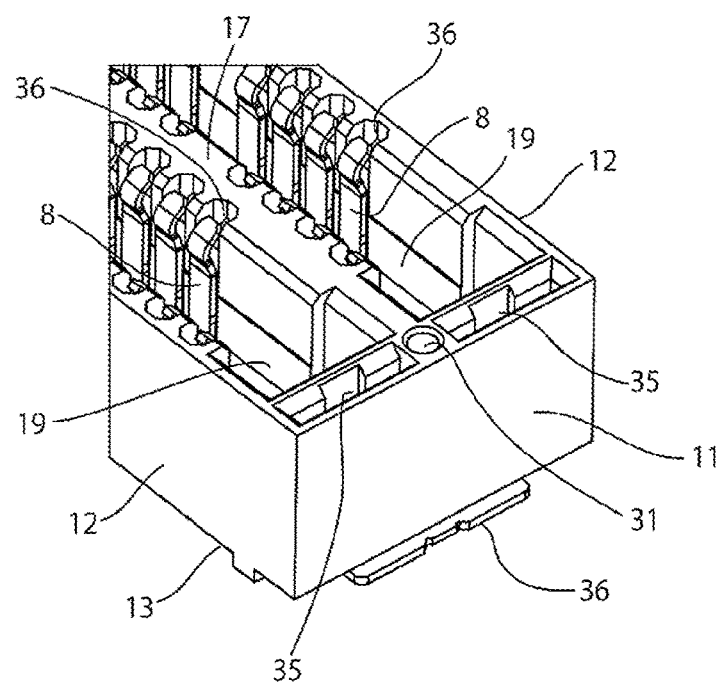
FIG. 4B is an enlarged view of the B frame of FIG. 3A.

As shown in FIG. 4B, the end portion of the partition wall 17 on the −X side is connected to the wall portion 11 on the −X side. As shown in FIG. 4A, the end portion of the partition wall 17 on the +X side is not connected to the wall portion 11 on the +X side, and a gap 18 is formed between the end portion of the partition wall 17 on the +X side and the wall portion 11 on the +X side.

Figure 6:
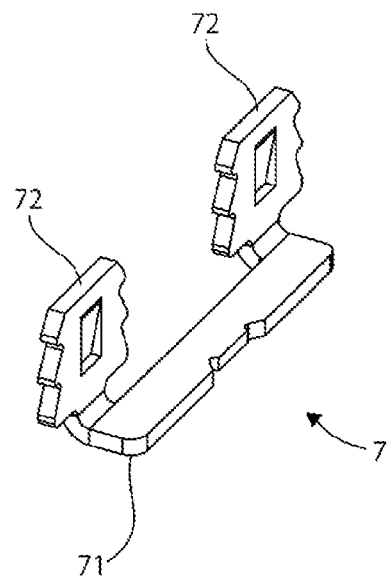
FIG. 6 is a perspective view of a solder tab terminal of the connector of FIG. 5.

A round hole 31 is provided in the middle of the wall portion 11 on the −X side in the Y direction. A long hole 33 is provided in the middle of the wall portion 11 on the +X side in the Y direction. The long hole 33 is opened on the +X side. Rectangular grooves 35 are provided on the +Y side and the −Y side of the holes in the wall portion 11 on the −X side and the wall portion 11 on the +X side. The rectangular grooves 35 are recessed from the upper surfaces of the wall portions 11 toward the bottom portion 13. Holes are perforated at the bottoms of the rectangular grooves 35, and the solder tab terminals 7 are fitted and fixed in the holes. As shown in FIG. 6, the solder tab terminal 7 has an elongated substrate portion 71 and two projecting piece portions 72 rising from two end portions of one long side of the substrate portion 71. The two projecting piece portions 72 are fitted into the holes at the bottom of the rectangular groove 35 of the housing 10.

Figure 8A:
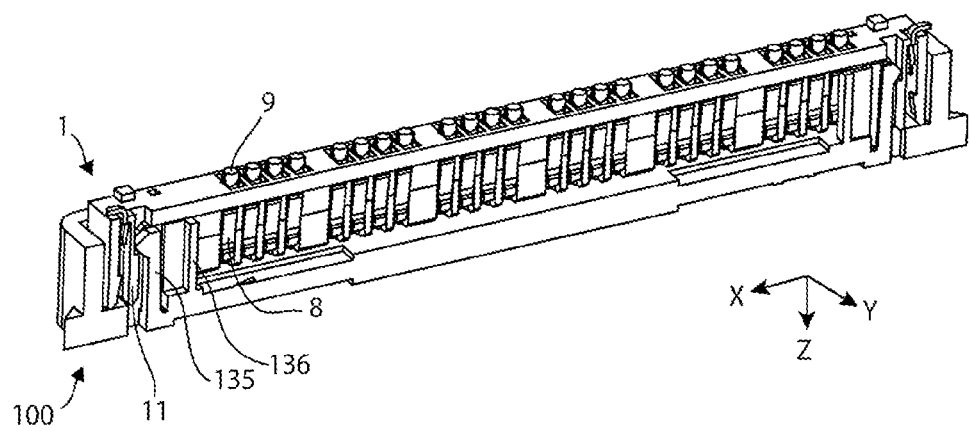
FIG. 8A is a sectional view of a cut surface parallel to the XZ plane, while the cap is attached to the connector.
Figure 8B:
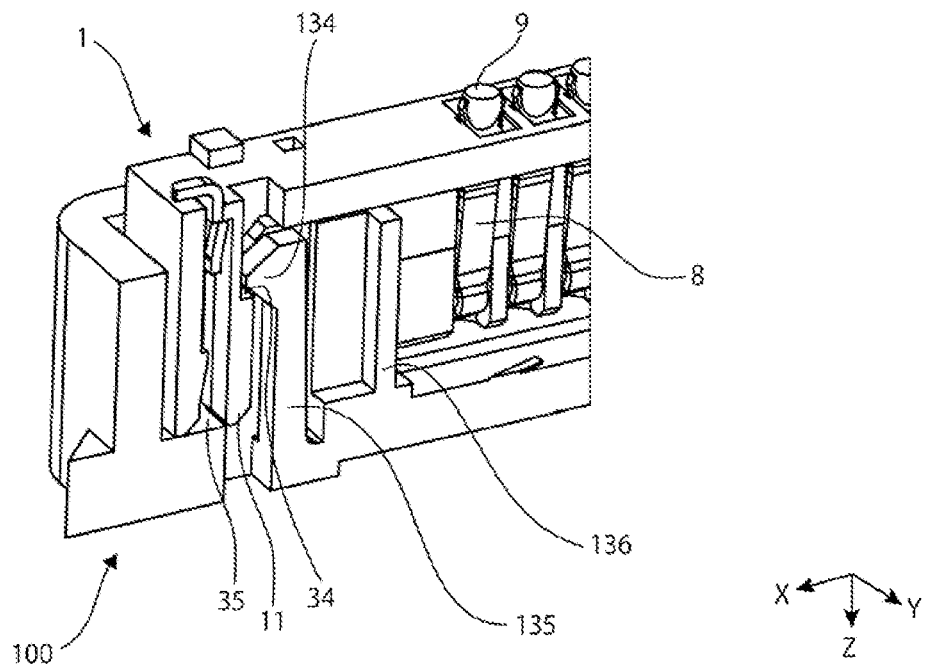
FIG. 8B is an enlarged view of a portion on the +X side of FIG. 8A.

As shown in FIG. 8B, on the lower sides of the inner surfaces of the wall portions 11 on the +X side and the −X side on the slots 19 sides, there are engaging pieces 34 projecting to the slots 19 sides.

Figure 7:
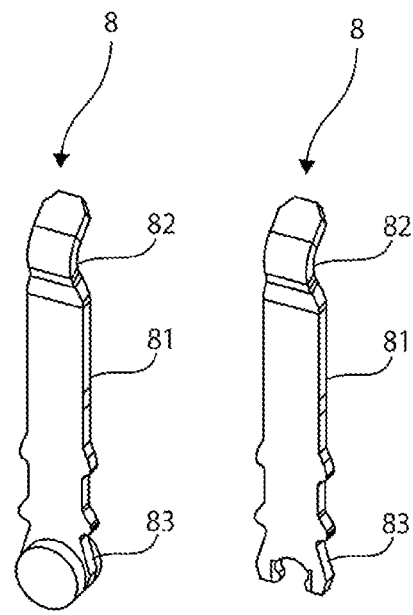
FIG. 7 is a perspective view of a contact of the connector of FIG. 5.

Grooves 36 are provided in the inner surfaces of the wall portions 12 and the side surfaces of the partition wall 17. Contacts 8 are accommodated in the grooves 36. As shown in FIG. 7, the contact 8 has a linear portion 81 extending in one direction, a terminal portion 82 at one end of the linear portion 81, and a fork portion 83 at the other end of the linear portion 81. The terminal portion 82 is bent into a doglegged shape. The fork portion 83 is bifurcated. Solder 9 is caulked and fixed to the fork portion 83. The contacts 8 are held in the grooves 36 of the wall portions 12 and the partition wall 17, and the fork portions 83 of the contacts 8 and the solder 9 are exposed on the opposite side to the grooves 36 side through the holes in the bottom portion 13.

Figure 1:
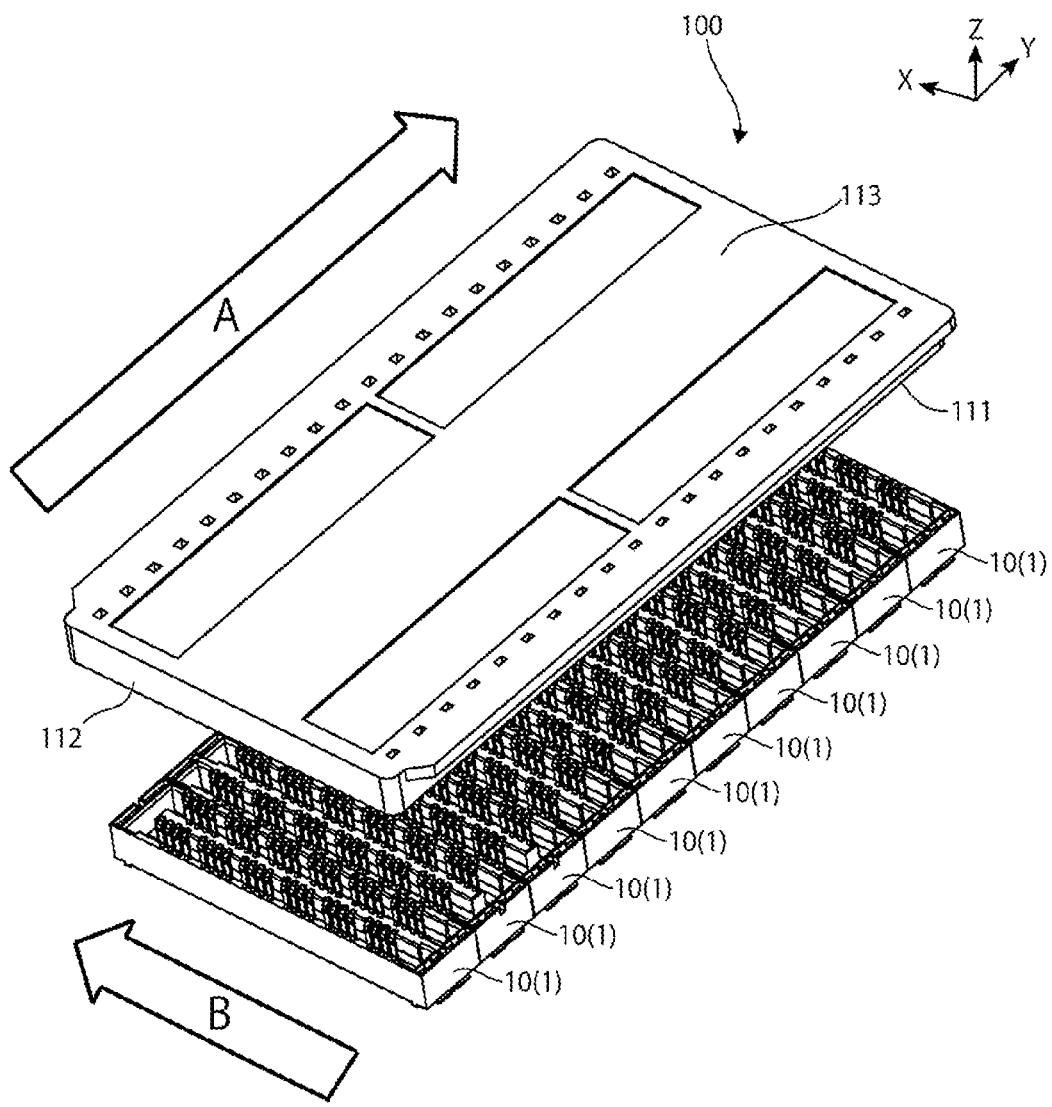
FIG. 1 is a perspective view of a connector and a cap to be attached to the connector according to one embodiment of the present disclosure.
Figure 2A:
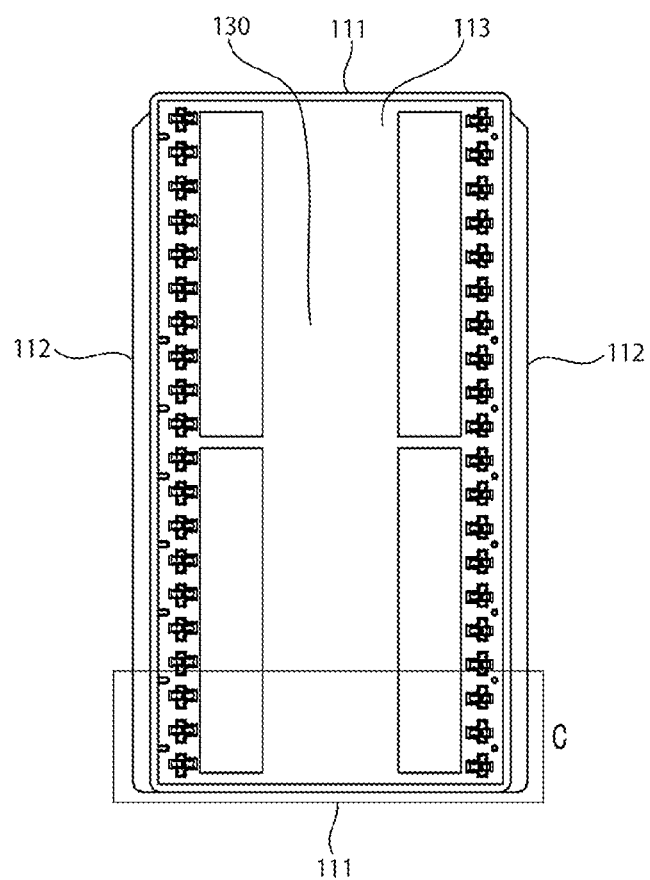
FIG. 2A is a diagram of the cap of FIG. 1 as viewed from a −Z side.
Figure 2B:
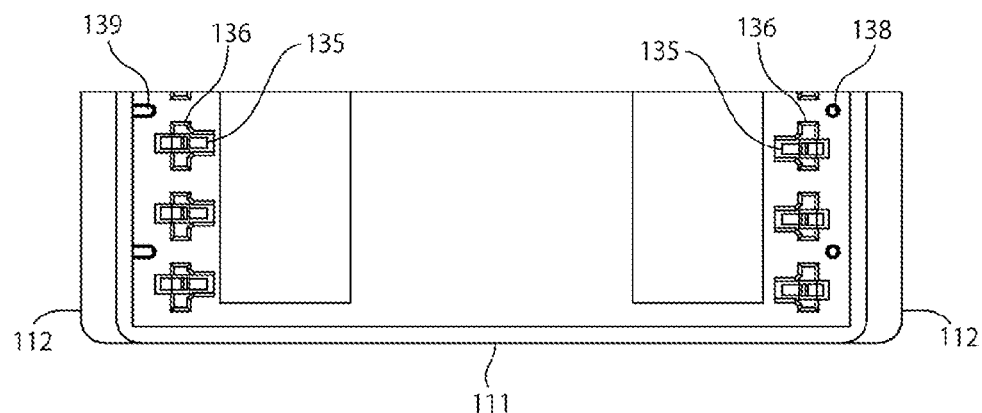
FIG. 2B is an enlarged view in the C frame of FIG. 2A.
Figure 3A:
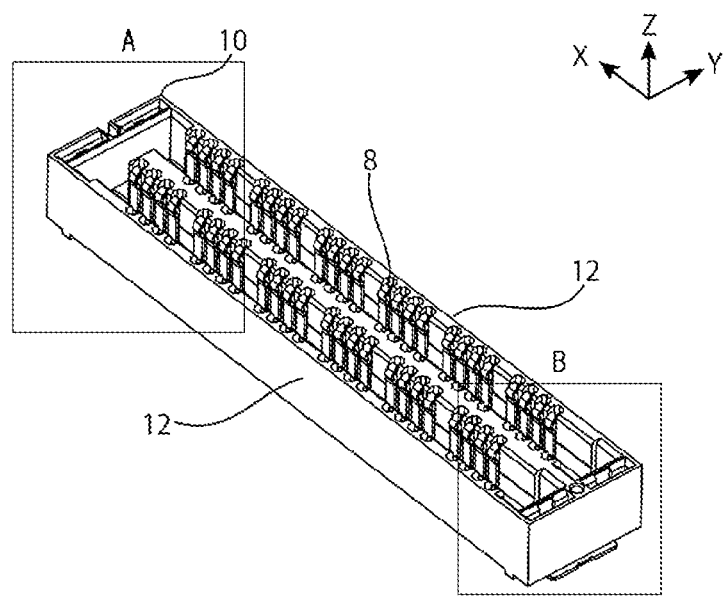
FIG. 3A is a perspective view of the connector of FIG. 1.
Figure 3B:
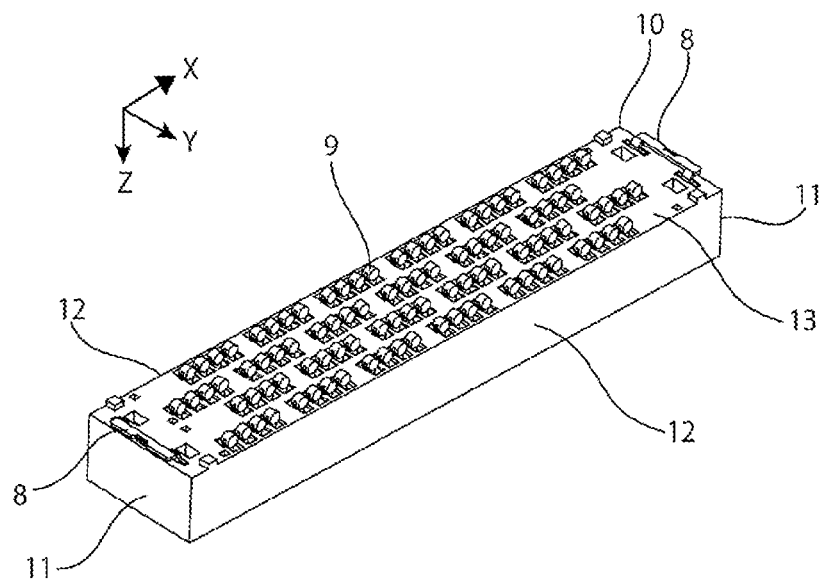
FIG. 3B is a perspective view of FIG. 3A as viewed from the opposite side.

As shown in FIG. 1 and FIG. 2, the cap 100 has a box shape with a width in the X direction and the Y direction slightly larger than that of eight connectors 1 arranged side by side. The cap 100 is formed by injecting resin in the arrow "A" direction of FIG. 1 which is the longitudinal direction thereof.

As shown in FIG. 2A, an opening 130 for accommodating and holding the connectors 1 is provided on the −Z side of the cap 100. The cap 100 has a top plate portion 113 that becomes a ceiling of the cap 100, wall portions 111 and wall portions 112 respectively facing each other in the X direction and the Y direction across the opening 130. A hooking spring 135 and a spring accommodation portion 136 are provided at a position corresponding to each slot 19 of eight housings 10 inside the wall portion 112 on the −X side and the wall portion 112 on the +X side. As shown in FIG. 8B, the lower end portion 134 of the hooking spring 135 projects outward in a triangular shape.

A positioning pin 138 is provided at a position corresponding to the round hole 31 between the adjacent spring accommodation portions 136 inside the wall portion 112 on the −X side. The positioning pin 138 has a shape to be put in the round hole 31. A positioning long pin 139 is provided at a position corresponding to the long hole 33 between the adjacent spring accommodation portions 136 inside the wall portion 112 on the +X side. The positioning long pin 139 has a shape to be put in the long hole 33.

The attachment of the cap 100 to the connectors 1 and the reflow mounting thereof are performed as follows. First, the eight connectors 1 are arranged so that the orientation of the gaps 18 of a part of the connectors 1 and the orientation of the gaps 18 of the remaining connectors 1 are reversed (for example, the gaps 18 of two connectors 1 in the middle are on the −X side, and the gaps 18 of two connectors 1 at both ends are on the +X side).

Next, the cap 100 is attached to the eight connectors 1 in such a manner that the positioning pins 138 are fitted into the round holes 31 on the −X side, the positioning long pins 139 are fitted into the long holes 33 on the +X side, and the hooking springs 135 are fitted inside the wall portions 11 on the +X side and the −X side. As shown in FIG. 8A and FIG. 8B, when the cap 100 is attached to the eight connectors 1, the lower end portions 134 of the hooking springs 135 of the cap 100 engage with the engaging pieces 34 of the connectors 1, and the connectors 1 are supported from the inside in the X direction by the hooking springs 135 of the cap 100.

Next, the eight connectors 1 gathered by the cap 100 are placed on a predetermined position of an electronic substrate, and are put into a reflow device. The temperature in the device is changed from 20° C. to 260° C. to 20° C. As the temperature rises, the cap 100 expands together with the housing 10. Here, as shown in FIG. 1, the injection direction of the cap 100 and the injection direction of the housings 10 are orthogonal to each other. For injection molded products, thermal expansion is more likely to occur in the direction orthogonal to the injection direction than the injection direction, and there is a difference of about 5 times between the thermal expansion coefficient in the injection direction and the thermal expansion coefficient in the orthogonal direction. When the cap 100 is heated while being attached to the connectors 1, the expansion amount of the cap 100 in the X direction becomes larger than the expansion amount of the connectors 1 in the X direction. Since the positioning pins 138 of the cap 100 are fitted in the round holes 31 of the connectors 1 and do not move, the portion of the cap 100 on the +X side of the positioning pins 138 expands to the +X side. When the cap 100 expands together with the connectors 1, the long holes 33 of the connectors 1 play a role of "clearance", and the positioning long pins 139 fitted in the long holes 33 move in the long holes 33 toward the opening portions on the +X side.

When the temperature exceeds 217° C., the solder 9 at the tip end portions of the contacts 8 of the connectors 1 is melted, and when the temperature returns to ordinary temperature, the solder 9 solidifies. The contacts 8 of the connectors 1 and the pads of the electronic substrate are connected to each other by the solidification of the solder 9. After the connectors 1 are attached to the electronic substrate, the cap 100 is removed from the connectors 1.

The details of the configuration of the present embodiment are mentioned above. The connector set according to the present embodiment includes a plurality of connectors 1 and a cap 100 to be attached to the plurality of connectors 1 when the plurality of connectors 1 are reflow-mounted on a substrate. Each one end portion of the connectors 1 and the cap 100 is provided with a long hole 33 as a fitted portion and a positioning long pin 139 as a fitting portion to be fitted in the long hole 33. The long hole 33 is provided with an opening portion for moving the positioning long pin 139 so as to absorb thermal expansion from one end side to the other end side due to the temperature conversion of reflow. Accordingly, it is possible to prevent distortion of the housings 10 and occurrence of solder cracks during reflow of the housings 10 of the connectors 1 and the cap 100.

Further, in the present embodiment, the housing 10 of the connector 1 has a rotationally asymmetrical shape. Thus, the connector of the communication counterpart also has a rotationally asymmetrical shape, so that it is possible to provide a connector that is unlikely to cause reverse insertion.

Although the embodiment of the present disclosure has been described above, the following modifications may be added to this embodiment.

(1) In the above embodiment, the number of the connectors 1 gathered by the cap 100 and mounted on the substrate may be two to three or four or more.

(2) In the above embodiment, there may be one or three or more rows of slots 19 in one connector 1.

(3) In the above embodiment, the positioning pin 138 and the positioning long pin 139 may be provided on the connector 1, and the round hole 31 and the long hole 33 may be provided in the cap 100.

Figure 9A:
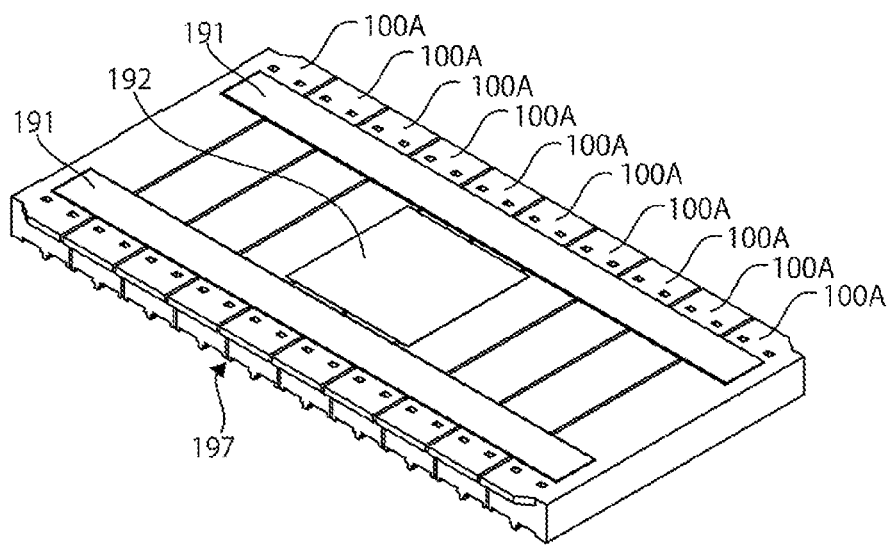
FIG. 9A is a perspective view of a cap as a modification example of the present disclosure.
Figure 9B:
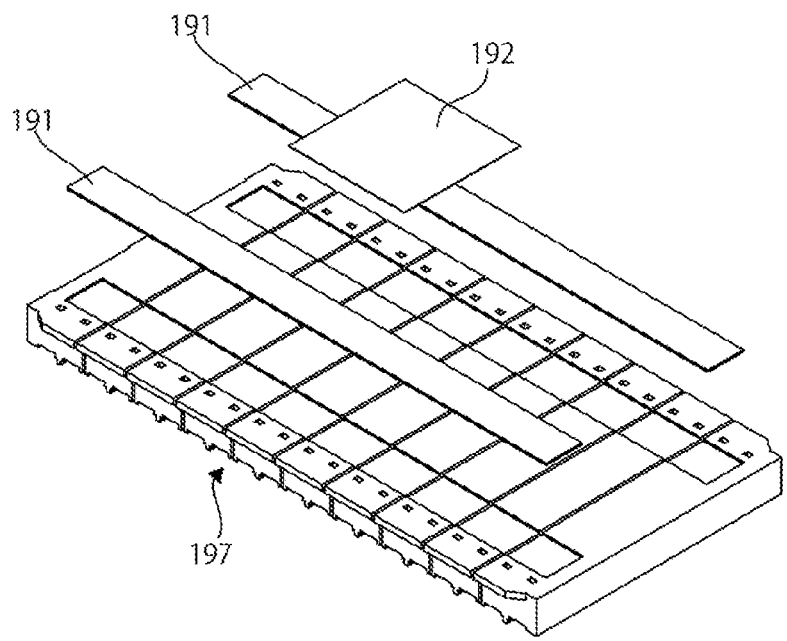
FIG. 9B is an exploded view of FIG. 9A.

(4) In the above embodiment, instead of gathering and holding a plurality of connectors 1 by one cap 100, one connector 1 may be mounted in one cap 100, and a plurality of caps 100 may be gathered by a linear member. As shown in FIG. 9A and FIG. 9B, in this modification example, a plurality of caps 100A are gathered by two linear first adsorption sheets 191, and split slits 197 are formed between the adjacent caps 100A. Each cap 100A has a box shape. Each cap 100A is provided with an opening for accommodating and holding the connector 1. The first adsorption sheets 191 are adsorbed on surfaces of the caps 100A opposite to the opening side. Further, a second adsorption sheet 192 is absorbed between the two first adsorption sheets 191 in the cap 100A. This second adsorption sheet 192 is used for picking the cap 100A at the time of reflow. According to this modification example, the expansion of the cap 100A in the longitudinal direction can be stabilized.

What is claimed is:

1. A connector set comprising a plurality of connectors and a cap to be attached to the plurality of connectors when the plurality of connectors are reflow-mounted on an external substrate, wherein each one end portion of the connectors and the cap is provided with a fitted portion and a fitting portion to be fitted in the fitted portion, and the fitted portion is provided with an opening portion to allow the fitting portion to move in the fitted portion toward an outside of the connector so as to absorb thermal expansion of the cap from one end portion side to the other end portion side due to temperature conversion of reflow.

2. The connector set according to claim 1, wherein:
the fitted portion is a long hole provided in the connector,
the fitting portion is a positioning long pin provided on the cap,
a round hole is provided on an opposite side to a side of the connector where the long hole is provided, and
a positioning pin to be fitted in the round hole is provided on an opposite side to a side of the cap where the positioning long pin is provided.

3. The connector set according to claim 2, wherein the connector comprises:
a housing with a plurality of slots separated by a partition wall; and
a plurality of contacts arranged in the slot.

4. The connector set according to claim 3, wherein the plurality of connectors are arranged in a direction orthogonal to an extending direction of the slots and held by the cap.

5. The connector set according to claim 3, wherein a number of the slots in one connector is two.

6. The connector set according to claim 3, wherein:
the housing comprises a bottom portion, two first wall portions and two second wall portions respectively facing each other across the slots,
the first wall portions extend in a direction orthogonal to the slots,
the cap is provided with a hooking spring, and
when the cap is attached to the connector in such a manner that the positioning pin is inserted into the round hole, the positioning long pin is inserted into the long hole, and the hooking spring is fitted inside the first wall portion, the connector is supported from the inside by the hooking spring of the cap.

7. The connector set according to claim 3, wherein the housing comprises a rotationally asymmetrical shape when viewed from a direction in which a connector of a communication counterpart is fitted.

8. The connector set according to claim 1, wherein a part of connectors of the plurality of connectors and the remaining connectors are arranged in opposite directions and mounted on the substrate.

9. A connector gathered by a cap and to be reflow-mounted on an external substrate, the connector comprising:
a plurality of slots extending in one direction and separated by a partition wall;
a bottom portion that functions as a bottom of the connector;
two first wall portions that extend in a direction orthogonal to the slots and face each other across the slots; and
two second wall portions that extend in a direction parallel to the slots and face each other across the slots so as to surround the slots together with the two first wall portions, wherein one first wall portion of the two first wall portions is provided with a round hole for fitting with a positioning pin of the cap, the other first wall portion of the two first wall portions is provided with a long hole for fitting with a positioning long pin of the cap, the long hole being opened on the other side, and when the cap expands together with the connector, the positioning long pin fitted in the long hole moves toward the other side in the long hole.

10. A connector set comprising a plurality of connectors, and caps to be attached to the connectors, respectively, when the connectors are reflow-mounted on an external substrate, wherein the cap has a box shape provided with an opening for accommodating and holding the connector, the connector is mounted on the external substrate on the opening side of the cap, and an adsorption sheet is adsorbed on surfaces of a plurality of caps opposite to the opening side, so as to connect the plurality of caps.

11. The connector set according to claim 10, wherein a split slit is formed between the adjacent connectors.

\* \* \* \* \*